Patented July 29, 1947

2,424,948

UNITED STATES PATENT OFFICE 2,424,948

PROCESS FOR REMOVING CYCLOPENTA-
DIENE FROM FORERUNNINGS

Joseph H. Wells and Philip J. Wilson, Jr., Pittsburgh, Pa., assignors to Carnegie-Illinois Steel Corporation, a corporation of New Jersey No Drawing. Application November 29, 1943,
Serial No. 512,253

2 Claims. (Cl. 260—342.4)

In accordance with the present invention, there are provided certain improvements in the production of an organic compound which can be used in the production of varnishes and similar coating compositions.

In accordance with the present invention, such valuable product is obtained from a low-boiling by-product present in the light oil produced in a by-product coke oven plant.

Thus, cyclopentadiene is one of the low boiling compounds present in the light oil which is produced in such a by-product coke oven plant, and forms the starting material for the production of the particular compound obtained in the operation of the present invention, this compound being a crystalline compound identified as endomethylene-3,6-tetrahydrophthalic anhydride.

As has been indicated above, cyclopentadiene is one of the low-boiling compounds present in the light oil which is produced in a by-product coke oven plant. Cyclopentadiene boils at 41.5° C. and consequently is difficult to separate in the pure form from the light oil by distillation. Other organic compounds present in the oil have boiling points close to that of cyclopentadiene. Thus carbon disulfide boils at 46.3° C., and some of the amylenes boil between 30° and 50° C. By use of a fractionating column with very high efficiency and careful control some separation may be secured, but the operating cost due to the high reflux ratio and the large intermediate fractions renders this method of separation prohibitive, even aside from the initial cost of the installation.

In accordance with the present invention, it has been discovered that this cyclopentadiene can be removed from the light oil and recovered in the form of a useful derivative, endomethylene-3,6-tetrahydrophthalic anhydride. The process employed in accordance with the present invention is, first, to fractionate the light oil so as to separate the cyclopentadiene and the other organic compounds which boil in the same temperature range in a single fraction. This separation may be carried out in a still equipped with a fractionating column. If a cut of all the compounds which boil between 20° C. and 60° C. is taken, for example, it will contain substantially all of the cyclopentadiene in the light oil, but practically no compounds which boil above 60° C., such as benzene which boils at 80° C. The above temperature range is to be considered as illustrative only, and not as limiting, and other temperature ranges may prove to be suitable. This fraction which contains the cyclopentadiene is called "forerunnings."

The next step in the process is the reaction of the cyclopentadiene in the forerunnings with maleic anhydride to produce endomethylene-3,6-tetrahydrophthalic anhydride which is precipitated in the form of colorless crystals. The reaction which occurs is as follows:

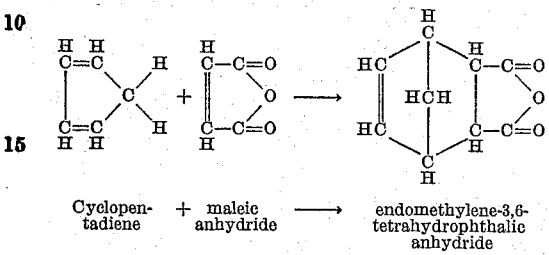

Cyclopen-  +  maleic   ⟶   endomethylene-3,6-
tadiene        anhydride         tetrahydrophthalic
                                 anhydride The proper amount of maleic anhydride for the reaction is determined by a preliminary laboratory test, and usually a little less than would be required for complete reaction with the cyclopentadiene is used in order to insure that the product does not contain any of this unreacted reagent.

The reaction may be carried out in various ways:

One procedure is to add the maleic anhydride crystals to the forerunnings and stir together until the reaction is complete. The reaction is strongly exothermic so that cooling must be provided in order to prevent loss of cyclopentadiene by vaporization. For a fraction which boils initially at 20° C. a temperature of not over 15° C. is recommended.

In any of the foregoing procedures, the next step is to filter the crystals of endomethylene-3,6-tetrahydrophthalic anhydride from the liquid by any suitable means, such as a plate and frame filter press. Some of the endomethylene-3,6-tetrahydrophthalic anhydride will be in solution in the forerunnings, or the benzene, respectively, depending on which reaction method has been used. This portion of the product is recovered by distilling off the solvent, but is likely to be less pure than the crystals separated by filtration due to impurities which may be dissolved in the solvent. After the endomethylene-3,6-tetrahydrophthalic anhydride crystals are filtered from molten maleic anhydride, the latter can be returned directly to the absorbers.

Although the endomethylene-3,6-tetrahydrophthalic anhydride crystals which are produced by this process are of good quality and can be used directly for some applications, they may be purified, if desired, by fractional crystallization from a suitable solvent, for instance benzene, or by washing with petroleum ether to remove the impurities.

The process of the present invention may be illustrated by the following example:

From 1000 gallons of light oil there was separated 15 gallons of forerunnings boiling up to 60° C. by distillation using a bubble plate fractionating column. The forerunnings contained 6.67 gallons or 44.5 pounds of cyclopentadiene. When 55 pounds of maleic anhydride were added to the forerunnings in an agitator kept at a temperature not over 15° C. endomethylene-3,6-tetrahydrophthalic anhydride was produced in the form of colorless crystals. By filtration using a plate and frame press 88 pounds of crystals were recovered.

The anhydride crystals which are produced can be reacted with glycerol or similar polyhydroxy alcohols to produce alkyd resins by processes which are commonly used in the resin industry.

The endomethylene - 3,6 - tetrahydrophthalic anhydride can exist in two stereoisomeric forms. The cis-form is the one which predominates in the product. It has a melting point of 164° C. Only very small amounts of the trans-form occur in the product.

Although the product is identified herein by the term endomethylene-3,6-tetrahydrophthalic anhydride, other terminology has been used to identify this product in the literature. Thus it has been called 3,6-endomethylene-1,2,3,6-tetrahydrophthalic anhydride. (See F. C. Whitmore, "Organic Chemistry," published in 1937.)

In the operation of the process of the present invention, maleic anhydride is not the only material that can be used in the reaction. Thus, instead of maleic anhydride, there may be used an acid anhydride of similar structure except that substituted for one or both of the hydrogen atoms are other organic groups, either aliphatic, aromatic, or both.

In fact, for maleic anhydride there may be substituted any similar conjugated alpha-beta-unsaturated carbonyl compounds which react with diolefins by what is commonly known to chemists as the Diels-Alder reaction, which is illustrated by the reaction indicated above herein.

Such compounds are the anhydrides of unsaturated dicarboxylic acids, and are exemplified by the general formula $C_nH_{2n-2}O_3$, and in addition to maleic anhydride

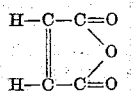

there may be mentioned citraconic anhydride

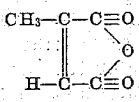

pyrocinchonic anhydride

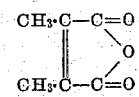

as further examples, all of these compounds being characterized by the group

and all behaving similarly to maleic anhydride.

We claim:

1. The process for removing cyclopentadiene from a forerunnings fraction with an endpoint distilling temperature of not more than 60 degrees C. obtained by fractionating the light oil produced in the by-product coking of coal, which comprises directly reacting the cyclopentadiene in the said forerunnings with an $\alpha,\beta$ unsaturated carbonyl compound containing the group

while maintaining the reaction temperature at not more than 15 degrees C., thereby preventing any substantial polymerization of the cyclopentadiene, and recovering the resulting substantially pure reaction product by filtration.

2. A process for the production of substantially pure endomethylene-3,6-tetrahydrophthalic anhydride which comprises directly reacting the cyclopentadiene contained in a forerunnings fraction, having an endpoint distilling temperature of not more than 60 degrees C. obtained by fractionation of light oil produced in the by-product coking of coal, with maleic anhydride while maintaining the temperature at not more than 15 degrees C., thereby avoiding any substantial polymerization of the cyclopentadiene, and recovering the resulting substantially pure reaction product by filtration.

JOSEPH H. WELLS.
PHILIP J. WILSON, JR.

REFERENCES CITED

The following references are of record in the file of this patent:

UNITED STATES PATENTS

| Number | Name | Date |
| --- | --- | --- |
| 2,104,956 | Stern | Jan. 11, 1938 |
| 2,068,850 | Ellis | Jan. 26, 1937 |
| 1,944,731 | Diels-Alder | Jan. 23, 1934 |

FOREIGN PATENTS

| Number | Country | Date |
| --- | --- | --- |
| 438,810 | Great Britain | June 2, 1934 |
| 352,164 | Great Britain | July 9, 1931 |

OTHER REFERENCES

Journal Amer. Chem. Soc., Feb. 1941, pages 627–628.

Industrial & Engineering Chem., Jan. 1932, pages 49–50.

Industrial & Engineering Chem., Anal. Edit., vol. 6, pages 104–106, 1934.

Industrial & Engineering Chemistry, volume 30, No. 2, Feb. 1938, pp. 169–172.